Sept. 11, 1956 W. W. HASTINGS 2,762,394
PRESSURE GAUGE DIAPHRAGM ASSEMBLY
Filed Feb. 9, 1954
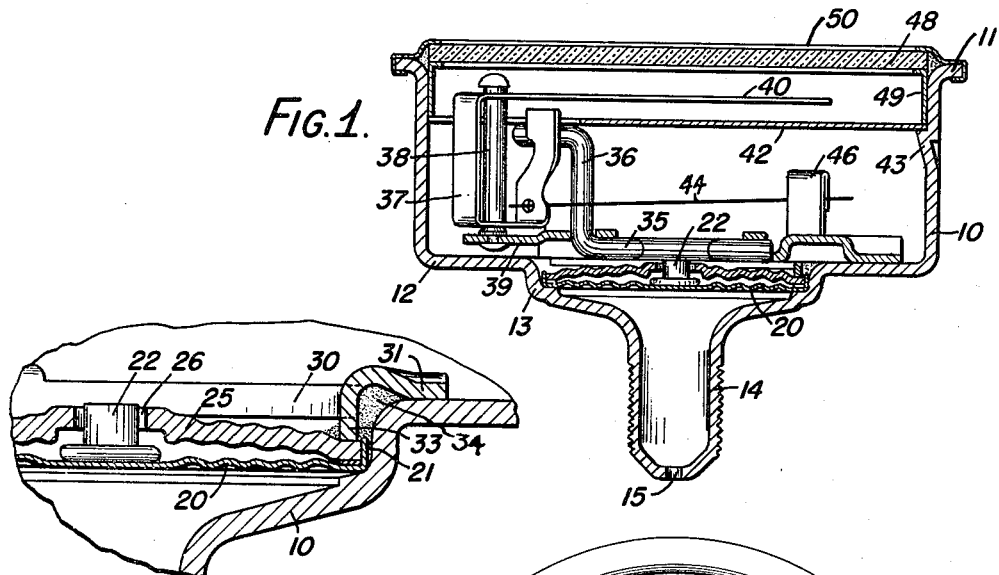
Fig. 1.
Fig. 2.
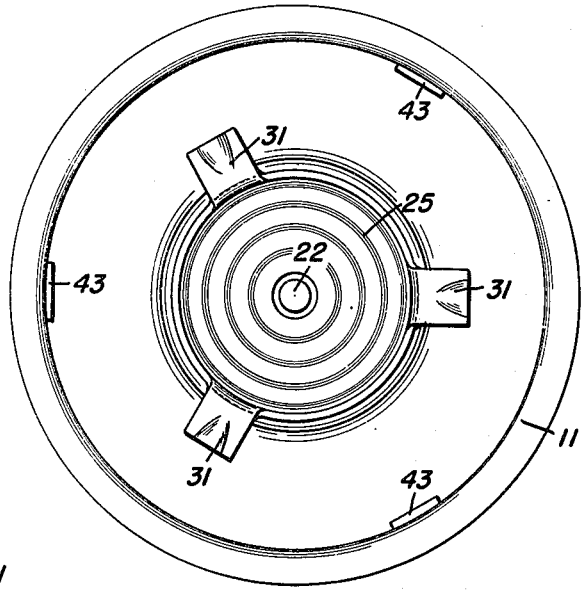
Fig. 3.
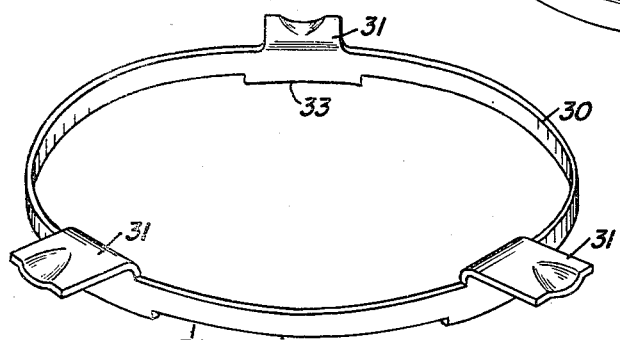
Fig. 4.
INVENTOR.
WARREN W. HASTINGS
BY
ATTORNEY United States Patent Office 2,762,394
Patented Sept. 11, 1956

2,762,394

PRESSURE GAUGE DIAPHRAGM ASSEMBLY

Warren W. Hastings, Brighton, N. Y., assignor to Rochester Manufacturing Company, Inc., Rochester, N. Y., a corporation of New York Application February 9, 1954, Serial No. 409,190

7 Claims. (Cl. 137—788)

The present invention relates to pressure gauges and more particularly to a diaphragm-operated pressure gauge.

Heretofore it has been the practice in manufacturing diaphragm-operated pressure gauges to secure the diaphragm in the gauge casing and to its backplate by staking and soldering. The usual practice is to peen or stake the adjacent portion of the casing over the peripheral circular flange of the diaphragm and to partially peen the diaphragm itself over the backplate, and to solder diaphragm, backplate, and casing together. The thinning of the case section from staking weakens the case at a critical point. Moreover, with this construction there is little or no solder bond between the casing and the diaphragm, and between the diaphragm and the back plate, due to the solder stop caused by the circular stake around the diaphragm. Furthermore, in use buckling of the diaphragm occurs above and below the mean horizontal plane of its operating movement. This is caused by the staking pressure squeezing the diaphragm around its periphery, as well as by the fact that the down pressure on the diaphragm and on the backplate is angular rather than vertical. The buckling of the diaphragm causes strains to be introduced in the metal which tend to vary the diaphragm position from time to time; hence changing the calibration of the pressure gauge slightly and affecting the accuracy of the gauge reading. For this reason it is customary to age all pressure gauges of the diaphragm type. However, this is not a hundred percent cure for the buckling, since the strains vary in magnitude, depending upon the variations in thickness of the diaphragm, the stake, and the weld.

To avoid these difficulties, it has been proposed, instead of peening a portion of the casing over the peripheral flange of the diaphragm around the whole of the periphery of the diaphragm, to peen the casing over the diaphragm flange only at spaced points around the periphery of the diaphragm. This, however, has worsened instead of improved the condition, since it localizes the strains instead of distributing them around the whole diaphragm. It produces erratic and inaccurate readings.

In all known diaphragm gauges the movement of the diaphragm is transmitted to the indicating pointer or needle through a post that is secured to the diaphragm. Heretofore it has been the practice to stake and solder the diaphragm post to the diaphragm. This is, however, a frequent cause of leaks.

The primary object of the present invention is to provide a diaphragm-operated pressure gauge of increased accuracy. To this end, one object of the invention is to provide an improved mounting for the diaphragm in a diaphragm-operated pressure gauge.

A further object of the invention is to provide a diaphragm-operated gauge in which the diaphragm can readily be secured in position by simple, inexpensive means.

A further object of the invention is to provide a diaphragm mounting which will eliminate strains and by increasing the accuracy of such gauges open new markets for them.

Another object of the invention is to provide an improved mounting for the diaphragm post in the diaphragm.

Other objects of the invention will be apparent hereinafter from the specification and from the recital of the appended claims.

In the drawing:

Fig. 1 is an axial section through a pressure gauge built according to one embodiment of this invention;

Fig. 2 is a fragmentary axial section through this gauge on an enlarged scale further illustrating the manner of mounting the diaphragm in the gauge casing;

Fig. 3 is a plan view of the gauge with the indicating mechanism, cover glass, and bezel removed, and showing the manner in which the diaphragm is secured to the gauge casing; and Fig. 4 is a perspective view on an enlarged scale of the weld ring used in securing the diaphragm in place in the improved gauge.

Referring now to the drawing by numerals of reference, 10 denotes the gauge case or housing. This case is provided with a seating flange 11, a base portion 12, a diaphragm housing chamber 13, and an externally threaded generally cylindrical stem portion 14. The threaded stem portion 14 is adapted to receive a tube connection, and has an opening 15 in its lower end through which the fluid, whose pressure is to be measured, is admitted to the diaphragm chamber.

The upper end of the stem section 14 is closed by the flexible diaphragm 20 which seats on an annular, radially-disposed seat in the diaphragm chamber 13. The diaphragm may be made in conventional fashion of relatively thin metal concentrically corrugated. The operating stud 22 is secured to the diaphragm at its center and projects forwardly from the upper, or front, face of the diaphragm. Instead of being mounted in a recess in the diaphragm and being staked and soldered thereto, as has been conventional practice, the diaphragm post or stud 22 of the gauge of the present invention is welded to the diaphragm, thereby eliminating the possibility of leakage around this post.

The diaphragm is backed up as customary by a relatively stiff and unyielding backplate 25 which is also corrugated concentrically, so that, if the diaphragm is sufficiently displaced axially, as by subjecting it to heavy pressure, substantially the entire face of the diaphragm may come into contact with the backplate 25 and be supported thereby against rupture. The backplate has a central hole 26 therein through which the operating stud 22 projects forwardly.

For mounting the diaphragm 20 and the backplate 25 in the case 10 a weld ring 30 is employed. This ring has three equi-angularly spaced legs or lugs 31 integral with it which project radially laterally from it. This ring is also formed with three equi-angularly spaced recesses 32 on its under side which bound three equi-angularly spaced and axially-extending protrusions 33. To secure the diaphragm 20 and the back plate 25 in the casing 10 the ring 30 is disposed against the front face of the back plate 25 with the bottom faces of the protrusions 33 seating against the front face of the backplate. A welding machine then forces the legs 31 of the ring 30 against the base portion 12 of the case 10 and the legs 31 are spot welded to the case. Soldering material 34 is then flowed in and around the space between the ring 30 and the case 10, between the peripheral flange 21 of the diaphragm and the case, between the flange of the diaphragm and the backplate 25, between the weld legs 31 and the case, and between the web of the weld ring 30 and the case, to securely bond the diaphragm and the back plate to the casing.

With this construction, the case 10 does not have to be thinned to provide staking material. Moreover, the weld ring 30 will melt down to the desired height, depending upon the thickness of the diaphragm, and can therefore accommodate diaphragms of different thicknesses, securely holding the same in position. Furthermore, there is no distortion of the diaphragm or the back plate, as is the case where the diaphragm is staked to the casing. Hence, there are no adverse strains built up in the diaphragm which could affect the accuracy of its movement. An improved construction is provided, therefore, which insures utmost accuracy in the gauge.

The indicating means of the gauge may be of conventional construction. Thus it may comprise a crank arm 35 which is connected to the upright pin 22. This crank arm has an extension 36 which engages one leg of a U-shaped member 37 which is mounted to pivot upon a pin 38 that is secured in a plate 39 which is fastened in any suitable manner within the case 10. The U-shaped member 37 has an indicating needle or pointer 40 formed integral with it that is adapted to read against graduations provided on a dial 42. Dial 42 is supported in the case 10 by tangs 43 peened inwardly of the case. The pointer 40 is normally held in its zero position by a spring wire 44 which is mounted at one end within a hole in one arm of the U-shaped bracket 37 and which is secured at its opposite end to a lug 46 that may be formed up from the plate 39. A glass 48, that is seated against a spacing ring 49, and a bezel 50 close the upper end of the case.

While the invention has been described in connection with a particular embodiment thereof and a particular use therefor, it is capable of various further modifications and uses; and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A pressure gauge comprising a casing provided with a radially-extending base portion, a hollow stem projecting axially beyond said base portion and open at its outer end, and a diaphragm chamber disposed between and connecting said base portion with said stem, said diaphragm chamber having a generally cylindrical portion connected with said base portion and being provided with an annular, radially-disposed seat, said seat extending inwardly of said cylindrical portion and being connected with said stem, a flexible metal diaphragm mounted on said seat and closing the inner end of said stem, said diaphragm having a centrally disposed stud projecting axially therefrom, a rigid metal backplate also mounted in said diaphragm chamber, said backplate being disposed at the opposite side of said diaphragm from said seat and having a central hole therethrough through which said stud extends, said diaphragm and backplate being soldered in said chamber around their peripheries, and means for additionally securing said diaphragm on its seat in said chamber comprising a weld ring which is positioned at the opposite side of said backplate from said diaphragm and which is disposed to engage said backplate adjacent the periphery only of said backplate, and which has a plurality of angularly-spaced laterally projecting lugs which project radially beyond the peripheries of said diaphragm and backplate and which are welded to said base portion.

2. A pressure gauge comprising a casing provided with a radially-extending base portion, a hollow stem projecting axially beyond said base portion and open at its outer end, and a diaphragm chamber disposed between and connecting said base portion with said stem, said diaphragm chamber having a generally cylindrical portion connected with said base portion and being provided with an annular, radially-disposed seat, said seat extending inwardly of said cylindrical portion and being connected with said stem, a flexible, metal diaphragm mounted on said seat and closing the inner end of said stem, said diaphragm having a centrally-disposed stud projecting axially thereof, a relatively rigid, metal backplate also mounted in said diaphragm chamber, said backplate being disposed at the opposite side of said diaphragm from said seat and having a central hole therethrough through which said stud extends, the periphery of said backplate being in contact with the periphery of said diaphragm, said diaphragm and backplate being soldered in said chamber around their peripheries, and means for additionally securing said diaphragm on its seat in said chamber comprising a weld ring which is positioned at the opposite side of said backplate from said diaphragm and which is disposed to engage said backplate adjacent the periphery of said backplate and having a plurality of angularly-spaced laterally projecting lugs which are welded to said base portion, the soldering material filling in the spaces being said diaphragm and said backplate, between said backplate and diaphragm and said chamber, and between said lugs and said casing.

3. A pressure gauge comprising a casing provided with a radially-extending base portion, a hollow stem projecting axially beyond said base portion and open at its outer end, and a diaphragm chamber disposed between and connecting said base portion with said stem, said diaphragm chamber having a generally cylindrical portion connected with said base portion and being provided with an annular, radially-disposed seat, said seat extending inwardly of said cylindrical portion and being connected with said stem, a flexible, metal diaphragm mounted on said seat and closing the inner end of said stem, said diaphragm having a centrally-disposed stud projecting axially thereof, a relatively rigid, metal backplate also mounted in said diaphragm chamber, said backplate being disposed at the opposite side of said diaphragm from said seat and having a central hole therethrough through which said stud extends, the periphery of said backplate being in contact with the periphery of said diaphragm, said diaphragm and backplate being soldered in said chamber around their peripheries, and means for additionally securing said diaphragm on its seat comprising a weld ring disposed at the opposite side of said backplate from said diaphragm and having a plurality of angularly-spaced, axially-extending protrusions thereon and a plurality of angularly-spaced generally radially-projecting lugs, said protrusions engaging said backplate at angularly spaced points adjacent its periphery and said lugs being welded to said base portion.

4. A pressure gauge comprising a casing provided with a radially-extending base portion, a hollow stem projecting axially beyond said base portion and open at its outer end, and a diaphragm chamber disposed between and connecting said base portion with said stem, said diaphragm chamber having a generally cylindrical portion connected with said base portion and being provided with an annular, radially-disposed seat, said seat extending inwardly of said cylindrical portion and being connected with said stem, a flexible, metal diaphragm mounted on said seat and closing the inner end of said stem, said diaphragm having a centrally-disposed stud projecting axially thereof a relatively rigid, metal backplate also mounted in said diaphragm chamber, said backplate being disposed at the opposite side of said diaphragm from said seat and having a central hole therethrough through which said stud extends, the periphery of said backplate being in contact with the periphery of said diaphragm, said diaphragm and backplate being soldered in said chamber around their peripheries, and means for additionally securing said diaphragm on its seat comprisng a weld ring which is positioned at the opposite side of said backplate from said diaphragm and which has a plurality of angularly-spaced, axially-extending protrusions thereon and a plurality of angularly-spaced generally radially-projecting lugs, said protrusions engaging said backplate at angularly spaced points adjacent its periphery, and said lugs being aligned axially with said protrusions and projecting radially beyond the peripheries of said diaphragm and said backplate and being welded to said base portion.

5. A pressure gauge comprising a casing provided with an annular, radially-extending base portion, a hollow stem projecting axially beyond said base portion and open at its outer end, and a diaphragm chamber disposed between and connecting said base portion with said stem, said diaphragm chamber having a cylindrical portion connected with said base portion and being provided with an annular, radially-disposed seat, said seat extending inwardly of said cylindrical portion and being connected with said stem, a flexible, metal diaphragm mounted on said seat and closing the inner end of said stem, said diaphragm having a centrally-disposed stud projecting axially thereof a relatively rigid, metal backplate also mounted in said diaphragm chamber, said backplate being disposed at the opposite side of said diaphragm from said seat and having a central hole therethrough through which said stud extends, said diaphragm having a circular, peripheral axially-extending flange, the periphery of said backplate being in contact with said flange, said diaphragm and backplate being soldered to one another and to said chamber around their peripheries, and means for additionally securing said diaphragm on its seat in said chamber comprising a weld ring which is positioned at the opposite side of said backplate from said diaphragm and which has a plurality of angularly-spaced, axially-extending protrusions thereon and a plurality of angularly-spaced, generally radially-projecting lugs, said lugs and protrusions being axially aligned, said protrusions engaging said backplate adjacent the periphery of said backplate at angularly spaced points, and said lugs projecting radially beyond the peripheries of said diaphragm and said backplate and being welded to said base portion, the soldering material filling in the spaces between the diaphragm and backplate, between the diaphragm flange and casing and between the lugs and casing.

6. A pressure gauge comprising a casing provided with an annular, radially-extending base portion, a hollow stem projecting axially beyond said base portion and open at its outer end, and a diaphragm chamber disposed between and connecting said base portion with said stem, said diaphragm chamber being provided with an annular, radially-disposed seat, a flexible, metal diaphragm mounted on said seat and closing the inner end of said stem, a metal backplate also mounted in said diaphragm chamber, said backplate being disposed at the opposite side of said diaphragm from said seat, said diaphragm and backplate being soldered to one another and in said chamber around their peripheries, and adidtional means for securing said diaphragm on said seat comprising a weld ring which is positioned at the opposite side of said backplate from said diaphragm and which engages said backplate adjacent its periphery only and which has a laterally-projecting portion that projects radially beyond the peripheries of said diaphragm and backplate and that is welded to said base portion.

7. A pressure gauge comprising a casing provided with an annular, radially-extending base portion, a hollow stem projecting axially beyond said base portion and open at its outer end, and a diaphragm chamber disposed between and connecting said base portion with said stem, said diaphragm chamber being provided with an annular, radially-disposed seat, a flexible, metal diaphragm mounted on said seat and closing the inner end of said stem, a metallic backplate also mounted in said diaphragm chamber, said backplate being positioned at the opposite side of said diaphragm from said seat, said diaphragm and backplate being soldered to one another and in said chamber around their peripheries, and additional means for securing said diaphragm on said seat comprising a weld ring which is positioned at the opposite side of said backplate from said diaphragm and which has axially-extending protrusions which engage said backplate at angularly-spaced points adjacent its periphery and which has a laterally-projecting portion that projects radially beyond the peripheries of said diaphragm and said backplate and that is welded to said base portion.

References Cited in the file of this patent

UNITED STATES PATENTS

| | | |
|---|---|---|
| 79,669 | Matthes | July 7, 1868 |
| 901,375 | Rigby | Oct. 20, 1908 |
| 2,032,563 | Clifford et al. | Mar. 3, 1936 |
| 2,220,902 | Hastings et al. | Nov. 12, 1940 |
| 2,550,672 | Chyba | May 1, 1951 |

FOREIGN PATENTS

| | | |
|---|---|---|
| 297,216 | Great Britain | Sept. 20, 1928 |